United States Patent
Frank et al.

(10) Patent No.: US 7,339,293 B2
(45) Date of Patent: Mar. 4, 2008

(54) ELECTRIC MACHINE WITH A WRAPPED WINDING COOLED TO A LOW TEMPERATURE

(75) Inventors: Michael Frank, Uttenreuth (DE); Adolf Kühn, Röthenbach (DE); Peter Massek, Forchheim (DE); Peter Van Hasselt, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 358 days.

(21) Appl. No.: 10/540,281

(22) PCT Filed: Nov. 21, 2003

(86) PCT No.: PCT/DE03/03858

§ 371 (c)(1),
(2), (4) Date: Aug. 8, 2005

(87) PCT Pub. No.: WO2004/057741

PCT Pub. Date: Jul. 8, 2004

(65) Prior Publication Data

US 2006/0125331 A1 Jun. 15, 2006

(30) Foreign Application Priority Data

Dec. 19, 2002 (DE) .............................. 102 59 822

(51) Int. Cl.
*H02K 9/00* (2006.01)
(52) U.S. Cl. ...................... 310/52; 310/261; 310/271
(58) Field of Classification Search ............ 310/52–59, 310/40 R, 261, 271
See application file for complete search history.

(56) References Cited

U.S. PATENT DOCUMENTS

| | | | | |
|---|---|---|---|---|
| 3,625,634 | A | * | 12/1971 | Stedfeld .................. 416/198 R |
| 3,956,648 | A | * | 5/1976 | Kirtley et al. ............ 310/40 R |
| 4,017,755 | A | * | 4/1977 | Litz ......................... 310/40 R |
| 4,042,846 | A | * | 8/1977 | Sterrett et al. ................. 310/52 |
| 4,060,743 | A | | 11/1977 | Weghaupt |
| 4,117,357 | A | * | 9/1978 | Baumann ...................... 310/52 |
| 5,547,340 | A | * | 8/1996 | Dalton et al. ............ 415/121.2 |
| 2003/0101844 | A1 | * | 6/2003 | Gabrys ........................ 74/572 |
| 2003/0193255 | A1 | * | 10/2003 | Ludwig .................. 310/156.31 |

FOREIGN PATENT DOCUMENTS

| | | |
|---|---|---|
| DE | 32 12 416 A1 | 11/1982 |
| DE | 199 43 783 A | 3/2001 |
| EP | 0 805 545 A1 | 11/1997 |
| GB | 1 316 173 A | 5/1973 |
| GB | 2 299 217 A | 9/1998 |
| JP | 52032503 A | 3/1977 |
| JP | 53132711 A | 11/1978 |
| WO | WO 00/49703 | 8/2000 |
| WO | WO 02/50985 | 6/2002 |

* cited by examiner

*Primary Examiner*—Thanh Lam
(74) *Attorney, Agent, or Firm*—Henry M. Feiereisen; Ursula B. Day

(57) ABSTRACT

An electric machine has a rotor that is rotatable about an axis of rotation, and an especially superconducting winding which is to be cooled to a low temperature. The winding is enveloped by a securing means with a wrap. The outer contour of the wrap of the securing means increases from a smaller outside diameter to a greater outside diameter in the axial direction. The wrap is surrounded in a force-fitting manner by several securing rings which are arranged one behind another and have an inside diameter which conforms to the respective outside diameter of the outer contour.

10 Claims, 2 Drawing Sheets

ELECTRIC MACHINE WITH A WRAPPED WINDING COOLED TO A LOW TEMPERATURE

BACKGROUND OF THE INVENTION.

The invention relates to an electric machine with a rotor which can rotate about a rotation axis and has a winding to be cooled to a low temperature, in particular a superconducting winding, which is surrounded by a securing means with a wrap. A rotor for a corresponding machine is disclosed in DE 199 43 783 A1.

Two-pole or multi-pole windings of electric machines can be arranged uniformly on the exterior circumference of a winding support or a so-called pole core about a common axis, with a DC current having alternating current directions flowing through the windings. These windings can be applied to the outside of the winding support or arranged in slot-like recesses.

A corresponding electric machine with this type of multi-pole winding construction is disclosed in EP 0 805 545 A1. Each individual pole of this machine is produced by a partial winding of the "racetrack" type, with the superconducting conductors being wound about a yoke and located in a dedicated cryostat. A suitable superconducting material for the conductor is, in particular, $Nb_3Sn$.

Metal oxide superconducting materials, which have transition temperatures above 77 K and which are therefore also referred to as High-$T_c$ superconductors or HTS materials, are known since 1987. Accordingly, attempts have been made to also prepare windings with these conductors. However, it has been observed that the HTS conductors known to date can only support a relatively low current density in magnetic fields having an induction in the range of one Tesla or more, where electric machines operate. For this reason, windings made from these conductors must be maintained at a temperature below 77 K in spite of the relatively high transition temperatures of their conductors.

The aforedescribed published patent application DE 199 43 783 A1 describes a rotor with a multi-pole winding that uses HTS conductors. This rotor has a winding support with coil sections which are arranged with a relative 90° offset in the circumferential direction and form the four individual poles of the rotor. Each of the coil sections consists of a stack of planar coil elements of the "racetrack" type, wherein each coil element is prepared from HTS superconductor tape. The coil sections are arranged so that their outside contours match at least substantially a common exterior cylindrical surface of the support or pole core.

Advantageously, corresponding HTS rotor windings are produced by first prefabricating and then testing the coils. These coils or coil packets can be combined into larger units and subsequently mounted on the pores of the supporting rotor body. During operation, the coils are subjected to considerable centrifugal forces caused by the rotation as well as to magnetic forces. These forces attempt to pull the coils toward the outside. Because a movement of the winding and in particular of the superconducting material is undesirable, the coils have to be properly secured. A suitable securing means can be a tubular sheath or a wrap made from glass fiber-reinforced plastic material. However, with large forces, the strength and stiffness of the fiber-reinforced plastic material is generally insufficient, so that typically tubular sheaths (see U.S. Pat. No. 4,060,743 A). Alternatively, segmented tubular sheaths or rings (see DE 32 12 416 A1) made of metal are used as securing means, because the elastic modulus of metals is typically 5 to 10 times greater than those of fiber-reinforced plastic. For example, one disclosed metal jacket is formed by winding around the coil support a steel tape analogous to a fiber tape (see WO 00/49703 A). Because a metal tape, unlike a fiber tape, has a high transverse stiffness already during the winding process, such metal wrap is difficult to manufacture.

SUMMARY OF THE INVENTION

It is therefore an object of the present invention to provide for the machine with the aforedescribed features a tubular securing means which encloses the winding, which can be easily and cost-effectively manufactured, and which provides the required mechanical stability sufficient for absorbing the generated forces.

This object is solved for a machine with the aforedescribed features by the invention in that
the securing means has, as viewed in the axial direction, a wrap with an outside contour that widens from a smaller outside diameter to a greater outside diameter, when viewed in the axial direction, and
the wrap is surrounded by several sequentially arranged force-fitting securing rings with an inside diameter which is adapted to the corresponding outside diameter of the outside contour.

Thus, in the embodiment of the machine according to the invention, the required total stiffness of the securing moans is not provided by a single component. Instead, a fiber-reinforced plastic wrap is applied around the winding (=the totality of all the winding coils), for example on the pole core with the individual coils. The outside contour of the wrap has an at least approximately conical shape at least In the region of the winding, whereby the precision of the cone does not have to be very high. The securing or support rings which are additionally applied to the cone for mechanical reinforcement, are not implemented as a whole cylinder, but instead as separate ring-shaped elements with different inside diameters adapted to their corresponding installation location. These diameters need not be precisely maintained; the rings should only have a diameter suitable for enabling contact on the different locations on the cone. Is also not necessary that the securing or support rings are mounted flush next to each other; instead, they can be spaced in the axial direction, similar to the metal bands around a wooden keg. The exact spacing depends on the required axial stiffness of the winding and the maximally allowable expansion between the individual rings. The material and the cross-section of the rings are selected in consideration of the required support function.

Additional advantageous embodiments of the machine according to the invention are recited in the dependent claims.

The rotor can have a pole core receiving the winding and can optionally be made of a metallic material. The pole core can, on one hand, be used for guiding the magnetic flux and, on the other hand, for improving the mechanical attachment of the winding in the circumferential direction.

Advantageously, the wrap is produced, preferably wound, from a fiber-reinforced plastic band. Advantageously, the wrap can be further strengthened by using a hardenable plastic material to ensure a rigid tubular form of the wrap.

The securing rings can be made of a glass fiber-reinforced plastic or of a metal. They can be fabricated cost-effectively as prefabricated components.

The outside contour of the wrap can also have the shape of a double cone with an outside diameter that is tapered towards the corresponding sides of the rotor. The respective additional support or securing rings are then installed on the wrap from the two ends.

The winding for the machine according to the invention can be manufactured in a conventional manner from conventional low-temperature conductors. Advantageously, the winding can include a High-$T_c$ superconductor material, which is particularly maintained at a temperature below 77 K. The current carrying capacity of this material is therefore high.

BRIEF DESCRIPTION OF THE DRAWING

An exemplary preferred embodiment of the invention will be described hereinafter with reference to the drawing. It is shown schematically in form of a longitudinal cross-section in FIG. 1 a machine with securing means according to the invention, FIG. 2 the securing means of the machine configured according to the invention, and FIG. 3 a particular wrap of a securing means.

DETAILED DESCRIPTION OF PREFERRED EMBODIMENTS

Figure 1:
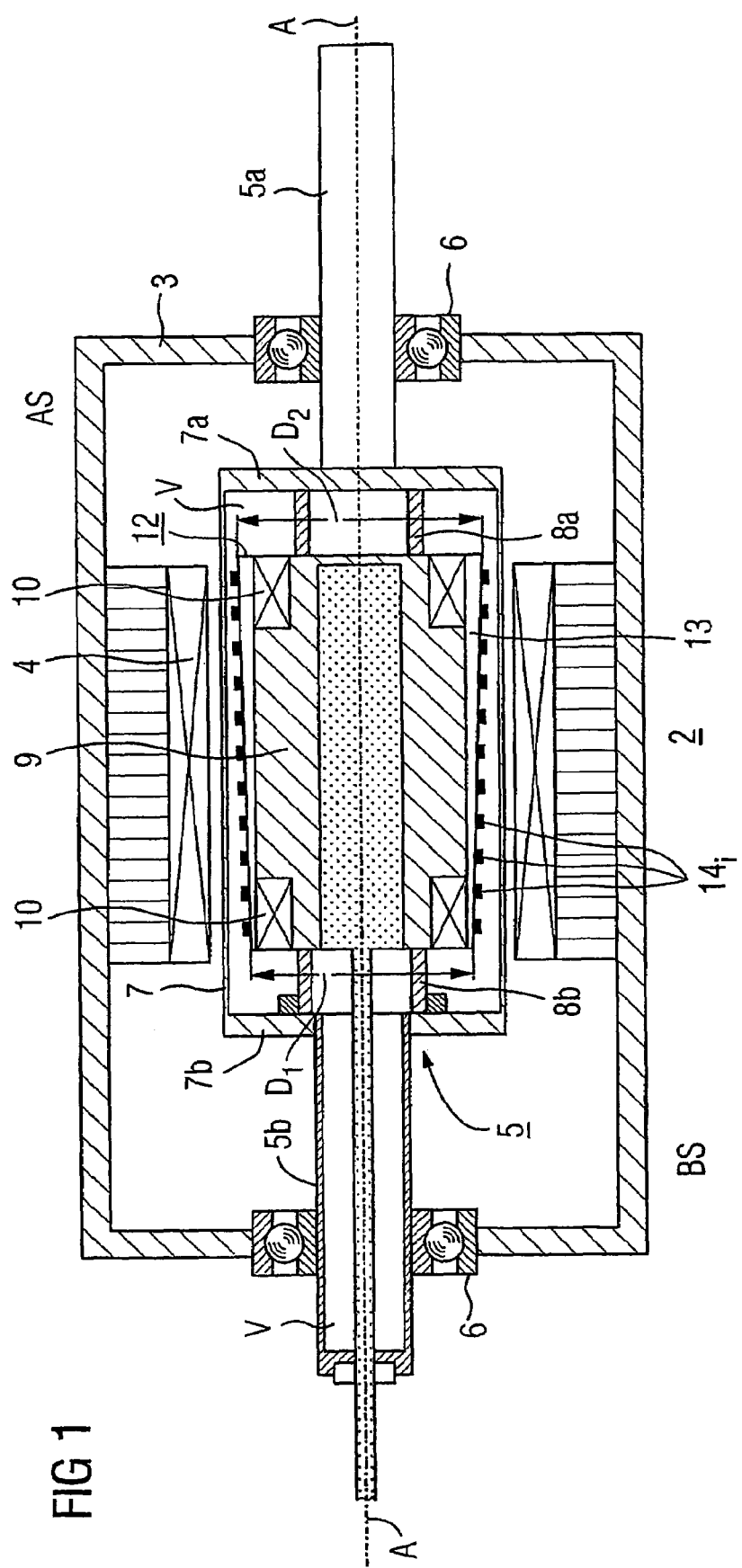

Identical or like elements in the figures are provided with identical reference symbols.

The embodiment of the machine described hereinafter can be, in particular, a synchronous motor, a generator, or any other machine. It will be understood that such machines can have applications for, for example, high rotation speeds, compact drives for, for example, ships, and for so-called offshore installations, such as drilling platforms.

The machine according to the invention includes a rotating winding to be cooled to a low-temperature, with conductors implemented, in particular, as superconductors. In principle, a metallic LTS material (Low $T_c$ superconducting material) or, more particularly, oxide HTS material (High $T_c$ superconducting material) can be employed. The latter material, such as for example $(Bi, Pb)_2Sr_2Ca_2Cu_3O_x$, is selected for the following exemplary embodiment. For achieving a high current carrying capacity, the material can be maintained during operation significantly below its transition temperature $T_c$, for example between 40 and 50 K. The winding can be made of a single coil or of a system of coils in a 2-, 4-, or another multi-pole arrangement. The basic configuration of such machine is shown schematically in FIG. 1, which is based on conventional configurations of such machines (see, for example, the aforedescribed state of the technology, or WO 02/50985).

The machine, generally designated with the reference numeral 2, includes a stationary outer machine housing 3 at room temperature with a stator winding 4. Inside the outer housing, which can be evacuated and is surrounded by the stator winding, a rotor 5 is supported in bearings 6 for rotation about a rotation axis A. On the so-called drive side AS of the machine, the rotor shaft includes an axial solid rotor shaft section 5a which is supported in a corresponding bearing. The rotor 5 has an outer housing 7 configured as a vacuum vessel, in which a winding support 9 or pole core with an HTS winding 10 is secured. This is accomplished by a (first) rigid tubular connecting device 8a on the drive side AS arranged between the winding support 9 and a disk-shaped side element 7a of the outer housing of the rotor, which is fixedly connected with the rotor shaft section 5a. The rigid connecting device 8a also transmits torque. On the operating side BS, i.e., the side not driven, located on the opposite side of the drive side AS, another connecting device 8b is arranged between the winding support 9 and a disk-shaped side element 7b of the outer housing 7 of the rotor.

FIG. 1 also shows on the side BS that faces away from the drive side a shaft element 5b formed as a hollow cylinder. The side of the shaft element 5b facing the outer housing 7 of the rotor is rigidly connected with the disk-shaped side element 7b. A coolant K which cools the superconducting winding 10 is also supplied from the outside the machine through this shaft section which is supported in a bearing 6. A vacuum surrounding the winding support 9 with the superconducting winding 10 has the reference symbol V. The vacuum is provided for thermal insulation, in particular, between the warm outer housing to 7 of the rotor and the cold winding support 9.

According to the invention, the winding 10 inserted in the slots in the winding support 9 is secured by special securing means 12 on the support 9 against movement when subjected to a force. For this purpose, a tubular, fiber-reinforced plastic wrap 13 is conventionally applied on the support that carries the winding. The wrap can optionally include a hardenable plastic for added stiffness. The outside contour of the wrap should assume an at least approximately conically taper already during application or later, for example by finish-machining, so that it widens, as viewed in the axial direction, from a smaller outside diameter $D_1$ to a greater outside diameter $D_2$. The widening in the axial direction can be continuous or stepped. In this way, additional supporting or securing rings $14_1$ can be pushed over the wrap 13 from the side of the smaller outside diameter $D_1$ when the rotor is installed. The inside the diameter of the individual rings is adapted to the outside diameter of the wrap at the location, where the corresponding securing ring is located after installation, to produce a forced engagement between the ring and the wrap. Optionally, these rings can at their respective location also produce a radial force that pretensions the wrap. The securing rings need not be placed flush next to each other, as indicated in the Figure, but can also be spaced apart, depending on the required stiffness.

Figure 2:
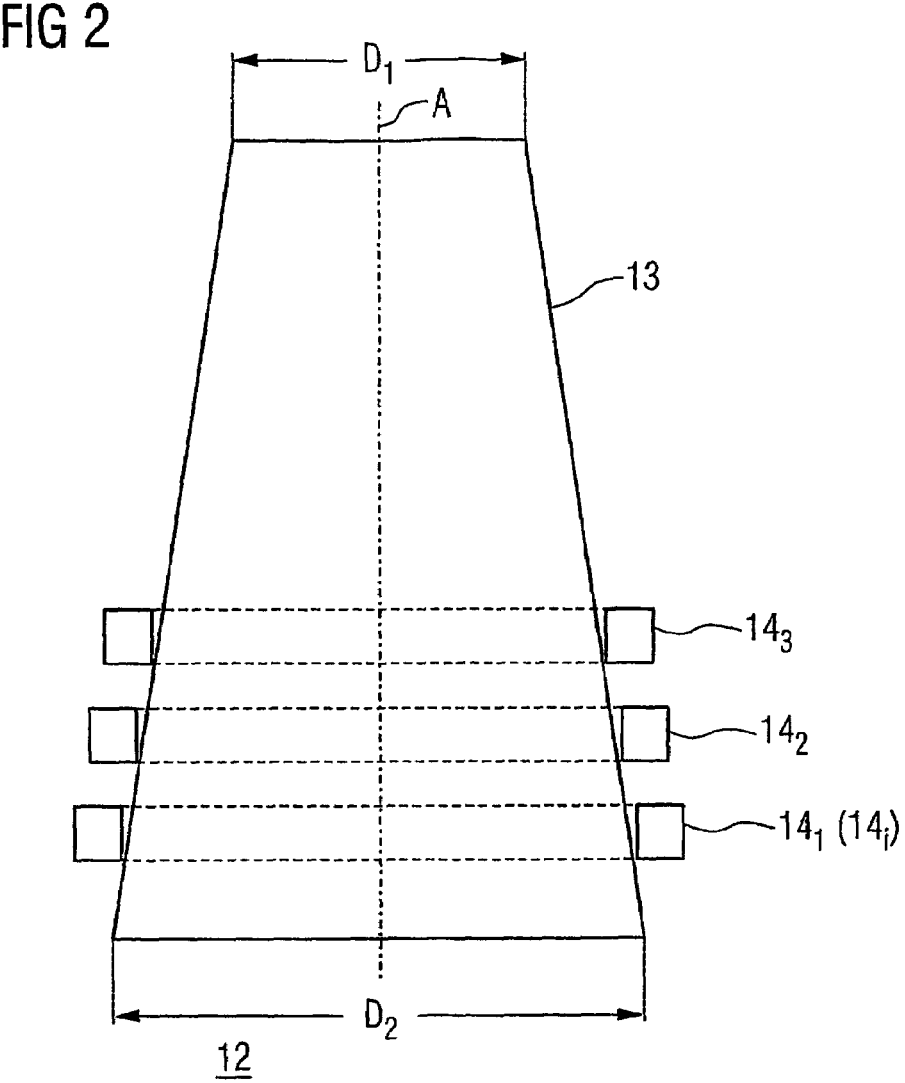

FIG. 2 shows an enlarged view of the wrap 13 with three exemplary supporting rings $14_1$ to $14_3$ out of a lamer number of rings $14_1$. The conicality of the wrap is exaggerated for emphasis. The rings are made, in particular, of a non-magnetic metal, such as stainless steel, or of a plastic fiber composite. There cross-sectional shape need not necessarily be square, as illustrated, but can also be rectangular, with the rings then formed as tube segments or hoops. Suitable are also round cross-sectional shapes, which make it easier to push the rings over the wrap.

In the preceding exemplary embodiment, it was assumed that the conicality of the outside contour of the wrap is obtained by machining or by removing material from the outside of the wrap. It is, of course, also possible to give the outside of the support body with the installed winding a conical shape and to then apply to the outside a wrap that has a constant thickness in the axial direction.

Figure 3:
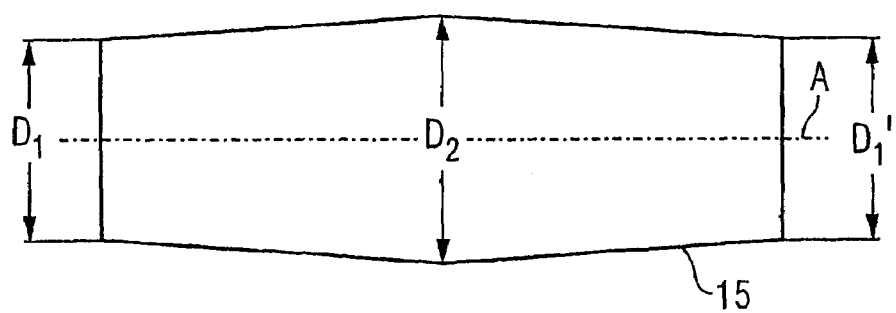

Of course, the outside contour of the securing means can also be shaped as a double cone. i.e., the outside diameter of the securing means would initially widen to a greater diameter in the axial direction from one side of the rotor towards the center of the rotor, and then narrow again toward the other side of the rotor. In this case, the securing rings would have to be applied from both sides of the rotor. A corresponding exemplary embodiment of a wrap, to which securing rings have not yet been applied, Is shown in FIG. 3. The wrap having the reference numeral 15 widens from one side (diameter $D_1$) toward the center (diameter $D_2$) and then tapers toward the other side (diameter $D_1'$). The diameters $D_1$ and $D_1'$ at the two sides need not be identical.

What is claimed is:

1. An electric machine, comprising:
   a rotor rotatable about a rotation axis, the rotor comprising a winding to be cooled to a low temperature;
   a securing means surrounding the winding and having a wrap, wherein the wrap of the securing means has, as viewed in the axial direction, an outside contour that widens from a smaller outside diameter to a greater outside diameter; and
   several sequentially arranged securing rings in force-fitting surrounding relationship to the wrap, wherein the securing rings have each an inside diameter which conforms to the outside diameter of the outside contour of the wrap at a corresponding axial position of the securing ring.

2. The electric machine according to claim 1, wherein the rotor has a pole core for receiving the winding.

3. The electric machine according to claim 1, wherein the wrap is a wound from a fiber-reinforced plastic band.

4. The electric machine according to claim 3, further comprising a hardenable plastic material provided in addition to the wrap.

5. The electric machine according to claim 1, wherein the securing rings are made of a fiber-reinforced plastic material.

6. The electric machine according to claim 1, wherein the outside contour of the wrap has the shape of a double cone with an outside diameter that is tapered towards respective sides of the rotor.

7. The electric machine according to claim 1, wherein the winding contains a High-$T_c$ superconductor material.

8. The electric machine according to claim 7, wherein the winding is to be maintained at a temperature below 77 K.

9. The electric machine of claim 1, wherein the winding is a superconducting winding.

10. The electric machine according to claim 1, wherein the securing rings are made of metal.

* * * * *